US007530177B1

(12) United States Patent
Meichle et al.

(10) Patent No.: US 7,530,177 B1
(45) Date of Patent: May 12, 2009

(54) MAGNETIC CALIPER WITH REFERENCE SCALE ON EDGE

(75) Inventors: Michael E. Meichle, Kirkland, WA (US); Kim W. Atherton, Kirkland, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 5 days.

(21) Appl. No.: 11/937,427

(22) Filed: Nov. 8, 2007

(51) Int. Cl.
G01B 7/14 (2006.01)
G01B 7/02 (2006.01)
(52) U.S. Cl. .......................................... 33/708; 33/784
(58) Field of Classification Search .................. 33/708, 33/1 PT, 706, 707, 783, 784, 791
See application file for complete search history.

(56) References Cited

U.S. PATENT DOCUMENTS

| | | | | |
|---|---|---|---|---|
| 4,077,129 | A | * | 3/1978 | Nishikata ...................... 33/784 |
| 4,226,024 | A | * | 10/1980 | Westerberg et al. ............ 33/783 |
| 4,229,883 | A | * | 10/1980 | Kobashi ....................... 33/784 |
| 4,612,656 | A | * | 9/1986 | Suzuki et al. .................. 377/24 |
| 4,686,472 | A | | 8/1987 | Van Ooijen |
| 4,703,378 | A | | 10/1987 | Imakoshi |
| 5,029,402 | A | | 7/1991 | Lazecki |
| 5,036,276 | A | | 7/1991 | Aizawa |
| 5,383,284 | A | * | 1/1995 | Rieder ......................... 33/706 |
| 5,386,642 | A | | 2/1995 | Spies |
| 5,574,381 | A | | 11/1996 | Andermo |
| 5,889,403 | A | | 3/1999 | Kawase |
| 5,901,458 | A | | 5/1999 | Andermo |
| 5,949,051 | A | | 9/1999 | Kiriyama |
| 5,973,494 | A | | 10/1999 | Masreliez |
| 6,070,132 | A | | 5/2000 | Ishimoto |
| 6,191,578 | B1 | | 2/2001 | Bezinge |
| 6,229,301 | B1 | | 5/2001 | Bolli |
| 6,326,780 | B1 | | 12/2001 | Striker |
| 6,332,278 | B1 | | 12/2001 | Bezinge |
| RE37,490 | E | | 1/2002 | Andermo et al. |
| 6,400,138 | B1 | | 6/2002 | Andermo |
| 6,404,192 | B1 | | 6/2002 | Chiesi |

(Continued)

OTHER PUBLICATIONS

"Miniature Electronic Connectors a/k/a Micro Miniature Connectors," Z-Axis Connector Company, as early as Jul. 2007, <http://www.zaxisconnector.com/micro-miniature-connectors-miniature-electronic-connectors.htm> [retrieved Apr. 15, 2008], pp. 1-2.

(Continued)

*Primary Examiner*—Christopher W Fulton
(74) *Attorney, Agent, or Firm*—Christensen O'Connor Johnson Kindness PLLC

(57) ABSTRACT

An electronic hand tool type caliper includes a scale track located along a scale member reference edge that forms a sliding bearing with a mating surface of the caliper slide, thereby maintaining proper alignment of the slide jaw. Placing the scale track along the reference edge is advantageous in that the reference edge surface is inherently precisely machined and particles are excluded by the inherently close fit and the wiping action of the sliding bearing. A readhead sensor is mounted within the slide surface that mates to the reference edge to provide the sliding bearing. Thus, a very small readhead sensor may be reliably positioned at an extremely small gap relative to the scale in a protected operating environment, without detrimentally affecting cost, slider friction, or signal strength. High resolution digital signals may be provided.

23 Claims, 11 Drawing Sheets

U.S. PATENT DOCUMENTS

| | | | |
|---|---|---|---|
| 6,604,289 | B2 | 8/2003 | Nikolov |
| 6,724,186 | B2 | 4/2004 | Jordil |
| 6,834,439 | B2 * | 12/2004 | Matsumiya et al. ........... 33/706 |
| 7,038,448 | B2 | 5/2006 | Schott |
| 7,141,965 | B2 | 11/2006 | Breuer |
| 7,173,414 | B2 | 2/2007 | Ricks |
| 7,180,146 | B2 | 2/2007 | Joisten |
| 2002/0129508 | A1 * | 9/2002 | Blattner et al. ................ 33/706 |
| 2003/0047009 | A1 * | 3/2003 | Webb .................... 73/862.541 |
| 2003/0159305 | A1 * | 8/2003 | Wahl et al. .................... 33/707 |

OTHER PUBLICATIONS

Smith, C.H., and R.W. Schneider, "Chip-Size Magnetic Sensor Arrays," NVE Corporation, papaer prepared for Sensors EXPO & Conference, San Jose, Calif., May 21-23, 2002. pp. 1-11.

* cited by examiner

MAGNETIC CALIPER WITH REFERENCE SCALE ON EDGE

FIELD OF THE INVENTION

The invention relates generally to metrology systems, and more particularly to electronically sensing movement or position between two members such as the moving parts of a caliper.

BACKGROUND OF THE INVENTION

Various electronic calipers are known that use electronic position encoders. These encoders are generally based on low-power inductive, capacitive, or magnetic position sensing technology. In general, an encoder may comprise a readhead and a scale. The readhead may generally comprise a readhead sensor and readhead electronics. The readhead outputs signals that vary as a function of the position of the readhead sensor relative to the scale, along a measuring axis. In an electronic caliper the scale is generally affixed to an elongated scale member that includes a first measuring jaw and the readhead is affixed to a slide which is movable along the scale member and which includes a second measuring jaw. Thus, measurements of the distance between the two measuring jaws may be determined based on the signals from the readhead.

Compact electronic hand tool type calipers, (e.g., those having a measurement range on the order of 100-250 mm) have evolved to have a relatively standardized configuration including a refined set of dimensions and ergonomics, as well as extremely low power consumption. Hand tool type calipers that are even slightly larger or heavier than the standardized configuration are generally rejected in the marketplace. In conventional calipers, the elongated scale member typically has a relatively wide top surface and relatively narrow edges. The encoder scale is affixed to the top surface and the readhead is affixed to a surface of the movable slide such that it moves along the top surface over the scale. An appropriate operating gap is provided between the readhead sensor and the scale. Among other advantages, this configuration allows the readhead to be collocated with the display and the other electronic components of the caliper, which is economical. This configuration also allows the use of a relatively large sensing region between the readhead sensor and scale. This is beneficial because the S/N ratio of the types of position encoders used in electronic calipers and typically benefits from increasing the sensing region dimensions for a given operating gap. Thus, this has been the conventional configuration. For example, U.S. Pat. Nos. 6,229,301; 6,724,186; 6,332,278; RE37,490; 5,973,494; and 5,574,381, each of which is hereby incorporated by reference in its entirety, show calipers conforming to this configuration.

U.S. Pat. No. 5,029,402, discloses a slightly different configuration used in an unconventional large caliper-type sliding gauge, which is described as being usable for measuring large objects such as tree trunks, etc. The sliding gauge includes a rod and a slide. The rod is disclosed as having eight sides. The rod includes markings that may be sensed by a length sensor on the slide. FIG. 6 of the '402 patent shows various surfaces where markings and length sensors may be applied, separated by an appropriate operating gap. In some embodiments, the widest surfaces of the rod are not used. However, the disclosure of '402 patent discloses a "caliper" that is not compact, and furthermore offers no clear advantages over the conventional caliper configuration outlined above, for conventional hand tool type caliper applications.

It would be desirable to advance the state of the art of compact hand tool type electronic calipers, and certain related compact "jawless" calipers that comprise similar or identical components used as low cost linear scales. For example, it would be desirable to further lower the cost of electronic calipers, and/or make them more reliable.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention is directed to an improved caliper configuration that provides certain cost and/or reliability advantages, and that enables the use of readhead and scale elements that have not been practical to use in known hand tool type caliper configurations. A caliper utilizing a high resolution magnetic scale track positioned along a reference edge of a scale member is provided.

In accordance with one aspect of the invention, the scale track may be located along an edge surface of the scale member that forms a sliding bearing with a mating surface of the caliper slide, thereby maintaining proper alignment of the slide jaw. Such an edge surface is therefore denoted a reference edge (also called a reference edge surface). In contrast, in known caliper configurations the scale track has been placed on the broad top surface of the scale member. Placing the scale track along the reference edge is advantageous in that the reference edge surface is inherently precisely machined. This is because the reference edge must guide the slide such that the measuring jaws of the caliper remain precisely parallel, to prevent measurement errors. Thus, the reference edge surface and the mating surface of the slide are inherently straight, smooth and flat. In addition, when the two surfaces slide against each other particles are excluded by the inherently close fit and the wiping action.

In accordance with another aspect of the invention, the readhead sensor may be mounted within the slide surface that mates to the reference edge. Thus, the readhead sensor may be reliably positioned at an extremely small gap relative to the scale, in a manner that is unprecedented in a hand tool type caliper configuration. Such a small gap allows an extremely small sensor to provide good signal strength and a high signal-to-noise ratio.

In a caliper, a loading edge (also called a loading edge surface) is located on the opposite side of the scale member from the reference edge surface. Typically, adjustment screws press a loading member against the loading edge to adjust the slide pressure and friction on the edge surfaces of the scale member. In accordance with another aspect of the invention, in some embodiments, the scale track may be located along the loading edge. In some embodiments, scale tracks may be located on both the loading edge and the reference edge. In general, for any readhead and scale configuration that is indicated as being positioned along the reference edge herein, in an alternative embodiment an analogous readhead and scale configuration may be positioned along the loading edge.

In accordance with another aspect of the invention, the extremely small gap between the readhead sensor and the scale track allow the use of previously-impractical miniature sensor technologies, such as miniature magnetic field sensors that require a close proximity between a magnetic scale and the sensor due to spacing loss.

In accordance with another aspect of the invention, in one embodiment the edge surface of the scale member may be used for a high resolution scale track, and the broad top surface of the scale member is used for a coarser resolution absolute position indicating scale track that is read by a known type of absolute position readhead.

In accordance with another aspect of the invention, in one embodiment the magnetic scale track information along the reference edge (may be included in a ferromagnetically soft material that is coated, painted, sputtered, embedded, or inlaid, wherein the presence, absence, or concentration of the material spatially delineates the scale information. In some embodiments, magnetically inert material can fill voids between magnetic materials along the edge. In some embodiments, the entire edge can be coated by a protective overcoat. The scale may be formed and detected as a change in the magnetic permeability along the length of the reference (or loading) edge in such embodiments.

In accordance with another aspect of the invention, in another embodiment, a magnetic coating can be uniformly painted, coated, inlaid, or sputtered along the reference edge, using a hard magnetic substance that is magnetizable. In one implementation, information may be written into such a material, where the magnetization direction and/or magnitude varies spatially and is detected by a readhead sensor which detects the field. Alternatively, in another embodiment, the scale member reference edge itself may be fabricated completely out of such a magnetizable material, for example a special hard ferromagnetic alloy, or a hard ferromagnetic ferrite ceramic or glass. In some embodiments, the reference edge may be protected by a protective coating, regardless of its composition.

According to this invention, a very small readhead sensor may be reliably positioned at an extremely small gap relative to the scale track in a protected operating environment, without detrimentally affecting cost, slider friction, or signal strength. High resolution digital signals may be provided from the readhead sensor, eliminating the need for analog signal interpolation in order to provide typical caliper measurement resolution.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
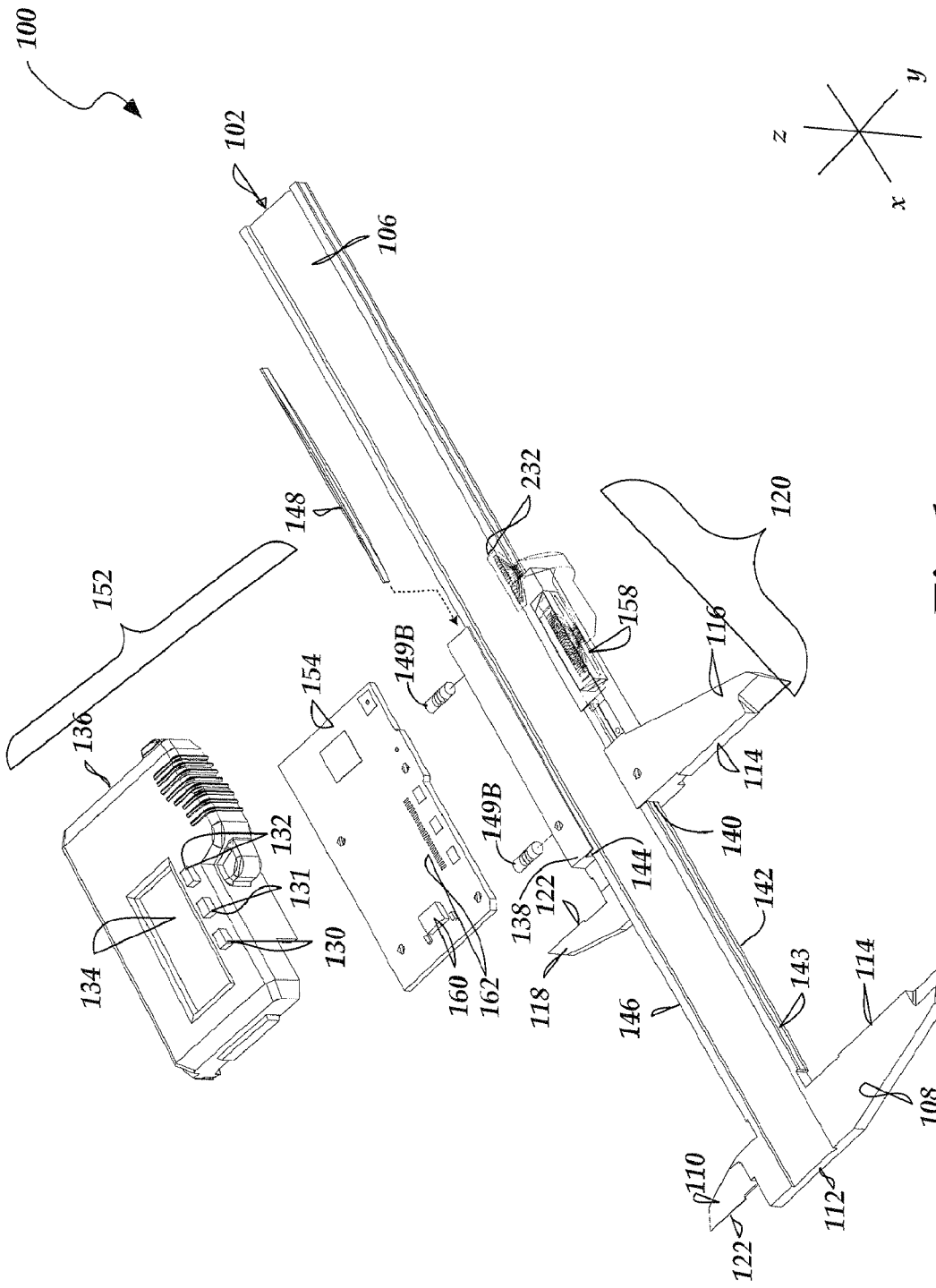
FIG. 1 is a diagram of a first exemplary embodiment of a hand tool type caliper including a magnetic sensor assembly and scale track along the reference edge surface of the scale member in accordance with the present invention.

FIG. 1 is an exploded view diagram of a first exemplary embodiment of a hand tool type caliper 100 including a magnetic sensor assembly 158 and scale track 143 positioned along the reference edge surface 142 of an elongated scale member 102 in accordance with the present invention. The magnetic sensor assembly 158 is positioned in a slider 138 to form a slider assembly 120, to which an electronic assembly 152 is attached. A portion of the slider 138 is shown in wireform outline, to better illustrate the magnetic sensor assembly 158. The general mechanical structure and physical operation of the caliper 100 is similar to that of certain prior electronic calipers, such as that of U.S. Pat. No. 5,901,458, which is hereby incorporated by reference in its entirety. The scale member 102 is a rigid or semi-rigid bar having a generally rectangular cross section. In some embodiments, a groove 106 may be formed in its wide upper surface to accept an elongated thin substrate (not shown). The elongated thin substrate may be rigidly bonded in the groove 106, and may include visual length indications and/or absolute position scale elements that cooperate with corresponding absolute readhead elements (not shown) included in electronic assembly 152, in a manner similar to that used in known electronic calipers and as described in previously incorporated RE37, 490 and U.S. Pat. No. 6,400,138, which is incorporated herein by reference in its entirety. The thin substrate may fill the groove 106, with its top surface coplanar with the top edges of scale member 102.

A pair of jaws 108 and 110 are integrally formed near a first end 112 of the scale member 102. A corresponding pair of jaws 116 and 118 are formed on a slider 138. The outside dimensions of a workpiece are measured by placing the workpiece between a pair of engagement surfaces 114 of the jaws 108 and 116. Similarly, the inside dimensions of a workpiece are measured by placing a pair of engagement surfaces 122 of the jaws 110 and 118 against opposing internal surfaces of the workpiece. In a position sometimes referenced as the zero position, the engagement surfaces 114 abut one another, the engagement surfaces 122 are aligned, and both the outside and inside dimensions measured by the caliper 100 may be indicated as zero.

The measured dimension may be displayed on a digital display 134, which is mounted within a cover 136 of an electronic assembly 152 of the caliper 100. The electronic assembly 152 may also include a set of push button switches 130, 131 and 132 (e.g., an on/off switch, mode switch, and zero set switch), and a signal processing and display circuit board 154 comprising a readhead signal processing circuit 160.

As shown in FIG. 1, the slider assembly 120 includes a slider 138 and provides a reference edge interface configuration and a loading edge interface configuration. In various embodiments, the reference edge interface configuration includes an internal reference surface 140 of the slider 138, and the loading edge interface configuration includes an internal loading surface 144 of the slider 138 (also shown in FIG. 5). In the embodiment shown in FIG. 1, the reference edge interface configuration also includes the magnetic sensor assembly 158, and the loading edge interface configuration also includes the loading member 148, and adjustment screws 149B.

In operation, the slider 138 straddles the scale member 102, the internal reference surface 140 mates against the reference edge surface 142, and the internal loading surface 144 opposes the loading edge surface 146 with the loading member 148 (e.g., a resilient pressure bar) compressed in between by the adjustment screws 149B, as described in greater detail below with reference to FIG. 5. As will be described in greater detail below, in various embodiments according to this invention, at least one of the reference edge 142 and the loading edge 146 include a scale track 143 that includes periodically arranged magnetic scale elements. In the embodiment shown in FIG. 1, the reference edge 142 includes the scale track 143.

As previously indicated, the electronic assembly 152 is attached to the slider assembly 120, such that they move as a unit. In one embodiment, the bottom surface of the signal processing and display circuit board 154 is mounted to abut the top surfaces of the slider 138 on either side of the scale member 102. The magnetic sensor assembly 158 is connected to the readhead signal processing circuit 160 by connecting an array of connection pads on the connector end 232 to the connector pad array 162 on the signal processing and display circuit board 154. In some embodiments, the connector end 232 may be routed through a resilient seal (not shown) that is compressed between the cover 136 and the signal processing and display circuit board 154, such that the electronic assembly 152 is completely sealed against contamination. In the slider assembly 120, the magnetic sensor assembly 158 is mounted in the slider 138 to sense the scale track 143 along the reference edge surface 142 of the scale member 102, as described in greater detail below with reference to FIG. 5.

It will be appreciated that locating the scale track 143 along the inherently precisely machined reference edge 142 provides unexpected advantages. The reference edge 142 is inherently precisely machined and designed to retain its integrity (clean, flat, smooth, "ding-free") in all calipers, because the reference edge 142 must guide the internal reference surface 140 of the slide 138 such that the engagement surfaces 114 of the caliper remain precisely parallel, to prevent measurement errors. Since the internal reference surface 140 must slide against the reference edge 142, this inherently provides a wiping action and "zero gap" between them, which inherently excludes contaminating particles. Thus, in the novel configuration of the caliper 100, the magnetic sensor assembly 158 is positioned in the slider 138 with miniature magnetic sensors located proximate to the scale track 143, to use this protected interface in a novel manner—to provide the extremely small, reliable, particulate-free gap relative to the scale track that is required for such a miniature magnetic sensors. It should be appreciated that while providing such a small, reliable gap ordinarily requires costly fabrication of close-tolerance features, in the configuration of the caliper 100 such a gap is provided "for free." Conversely, the novel use of this protected interface, to provide an extremely small, reliable, particulate-free gap at little or no additional cost, enables the use of previously-impractical miniature magnetic field sensor technologies that require a close proximity between a magnetic scale and the magnetic field sensor in order to avoid spacing loss. In the current context, spacing loss refers to the degradation of the signal from a magnetic sensor as its gap increases relative to a magnetic information track with a magnetic flux transition pitch of $\lambda$ along the magnetic track. It is known that the signal strength decreases approximately 55 dB*($\lambda$/d) as the gap d increases.

It should be appreciated that prior art electronic calipers have generally located larger magnetic, capacitive, or inductive sensors proximate to a larger scale track along the wide top surface (e.g., in a groove similar to the groove 106), in order to use a large gap that was obtained with low fabrication cost, and overcome the associated "large gap" spacing loss by using a larger sensor. An unexpected drawback that occurs if it is attempted to use an additional sliding interface to facilitate a small gap along the wide top (or bottom) surface of a caliper member, is that the friction between the slider 138 and the scale member 102 increases (e.g., the friction force may approximately double). It turns out that the associated force on the slider to overcome this addition friction is generally ergonomically unacceptable. Conversely, an unexpected advantage of the configuration of the caliper 100 according to this invention, is that an extremely small and reliable sensing gap is provided proximate to a sliding interface that is inherently necessary to maintain the alignment of the engagement surfaces 114, which means no features are introduced which might increase the minimum required amount of friction force between of the scale member 102 and the slider assembly 120.

Figure 2:
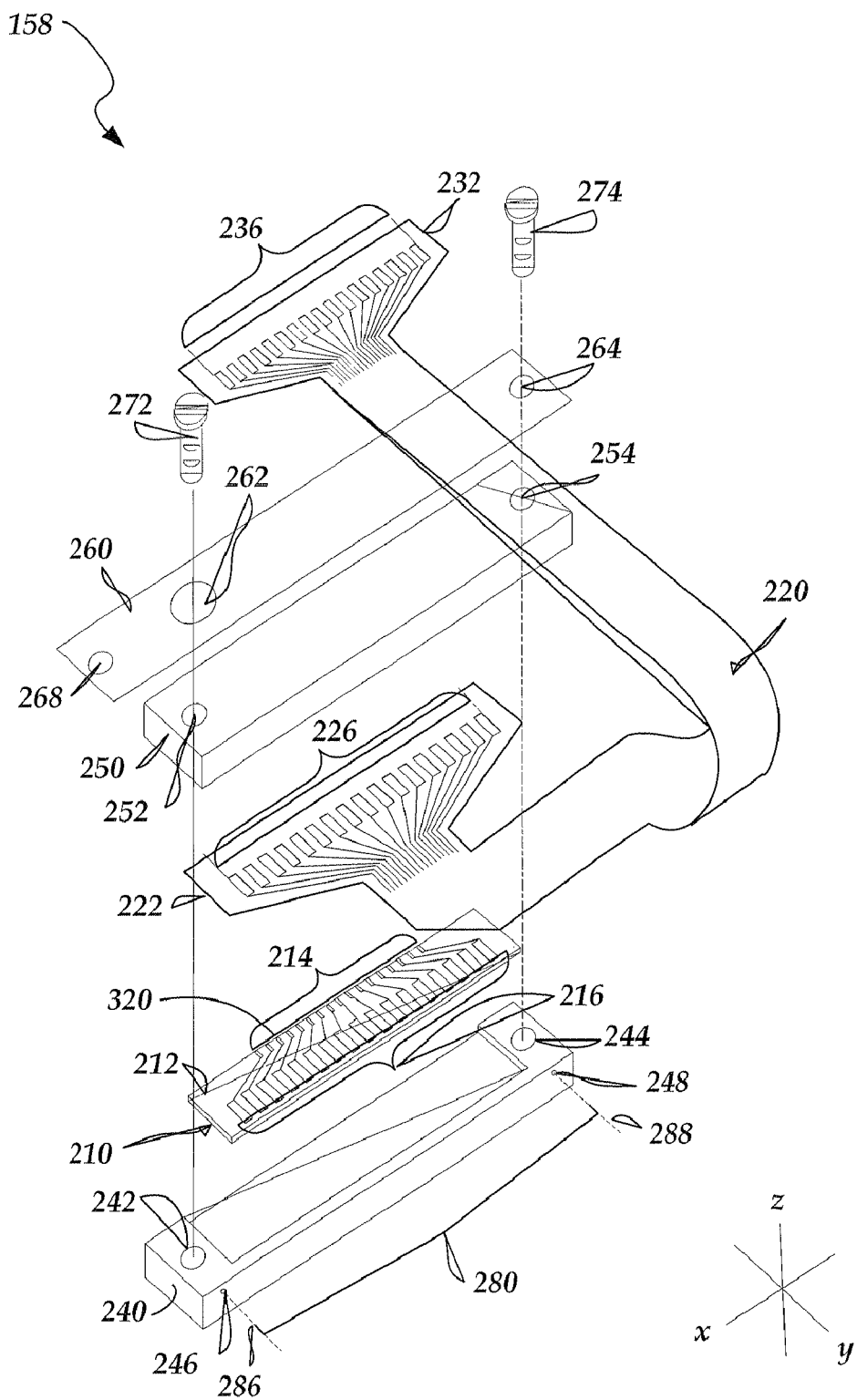
FIG. 2 is a diagram of a first exemplary embodiment of a magnetic sensor assembly usable in the caliper of FIG. 1.

FIG. 2 is a diagram of a first exemplary embodiment of the magnetic sensor assembly 158 of FIG. 1. As shown in FIG. 2, the magnetic sensor assembly 158 includes a sensing element head 210, a flexible connector 220, a bottom assembly block 240, a top assembly block 250, a mounting member 260, and a wire spring 280. The sensing element head 210 includes a sensing element array 214 and a connector pad array 216 which are disposed on a substrate 212. As will be described in more detail below with respect to FIG. 3, the sensing element array 214 may be coupled to the connector pad array 216 by a series of wires (e.g., circuit traces.)

As shown in FIG. 2, the flexible connector 220 has a first end 222 which includes a connector pad array 226, which couples to the connector pad array 216 on the readhead sensing element head 210. The flexible connector 220 also has a second end 232 which includes an array of connector pads 236 which couple to a connector pad array 162 on the signal processing and display circuit board 154 of FIG. 1. During operation, the sensing element array 214 is responsive to magnetic field modulating elements of the scale track 143 and transmits measurement signals through the flexible connector 220 to the readhead signal processing circuit 160 on the signal processing and display circuit board 154.

The magnetic sensor assembly 158 may be assembled by compressing the sensing element head 210 and first end 222 of the flexible connector 220 between the bottom assembly block 240 and the top assembly block 250. More specifically, the bottom assembly block 240 includes mounting holes 242 and 244, while the top assembly block 250 includes mounting holes 252 and 254, which receive assembly screws 272 and 274 for compressing the blocks 240 and 250 together. The mounting member 260 is also attached to the top of the assembly block 250, and includes a mounting hole 264 which receives the assembly screw 274, and a clearance hole 262 which provides clearance around the assembly screw 272. As will be described in more detail below with respect to FIG. 5, the mounting member 260 fixes the magnetic sensor assembly 158 relative to the slider 138 of the slider assembly 120.

The wire spring 280 includes ends 286 and 288 which are received by holes 246 and 248 in the bottom assembly block 240. The wire spring 280 is shaped with a slight bend so as to push the magnetic sensor assembly 158 away from the slider 138 and against the reference edge 142 and/or the scale track 143 with a desired force, to insure that the sensing element array 214 is located with the desired gap (e.g., a small gap, or no gap) relative to the scale track 143.

Figure 3:
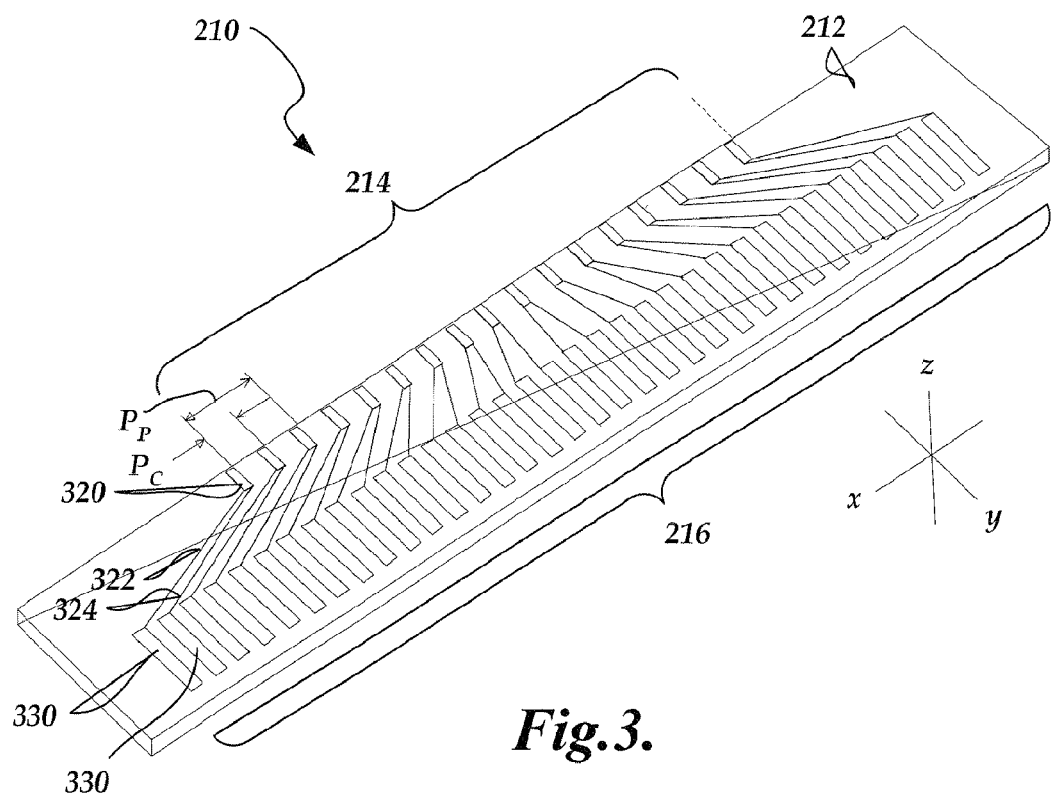
FIG. 3 is a diagram of a first exemplary embodiment of the sensing element head of the magnetic sensor assembly of FIG. 2.

FIG. 3 is a diagram of the sensing element head 210 of the magnetic sensor assembly 158 of FIG. 2. As shown in FIG. 3, the sensing element head 210 includes the sensing element array 214 and a connector pad array 216 which are disposed on a substrate 212. The sensing element array 214 includes individual sensing elements 320 while the connector pad array 216 includes individual connector pads 330. The individual sensing elements 320 are connected to the individual connector pads 330 by a series of wires (e.g., circuit traces.) More specifically, a first individual sensing element 320 is shown to be coupled to two individual connector pads 330 by wires 322 and 324, respectively. The individual sensing elements 320 may be arranged in sensing pattern cells that each consist of one or more sensing elements 320, and the pattern cells may be periodically spaced along the measuring axis direction (the x axis) at a sensing pattern pitch Pp, which may depend on a spatial wavelength or pitch $P_T$ of the scale track 143. In some embodiments, Pp=N*$P_T$, where N is a small integer (e.g., 1, 2, 3, etc.). In the embodiment shown in FIG. 3, a sensing pattern cell consists of two sensing elements 320 arranged at an intra-cell pitch of Pc. The individual sensing elements 320 are responsive to magnetic field modulating elements arranged along the scale track 143, as described in more detail below with respect to FIG. 6.

It should be appreciated that although the sensing element head 210 is illustrated in a single-sided embodiment, more generally a sensing element head may have sensing elements and/or connector elements fabricated on both sides of a substrate, or two single-sided substrates may be laminated together, in order to provide additional sensing elements within a given set of substrate dimensions, or to provide additional space between connector pads on each side of a two-sided sensing element head, or both. In general, any of the magnetic sensor assembly embodiments disclosed herein may be adapted to use such double-sided sensing element heads, with suitable connector modifications.

Figure 4:
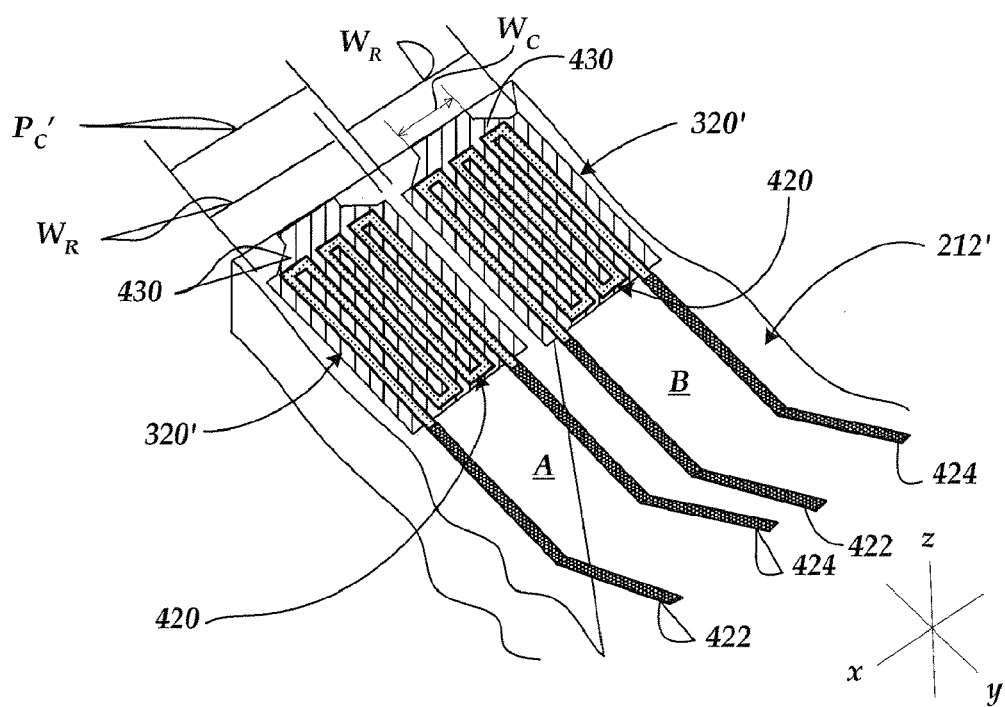
FIG. 4 is a diagram of a first exemplary embodiment of the magnetic field sensing elements of the sensing element head of FIG. 3.

FIG. 4 is a diagram of an exemplary embodiment of magneto-resistive magnetic field sensing elements 320' which may be used to provide a first embodiment of the sensing elements 320 of FIG. 3. This first embodiment is most appropriate when magnetized hard ferromagnetic material forms the magnetic field modulating elements along scale track 143. As shown in FIG. 4, two of the sensing elements 320', labeled A and B, may be disposed on a non-magnetic substrate 212' (e.g., glass or ceramic) at an intra-cell pitch of Pc'. Each of the sensing elements 320' includes a patterned thin magneto-resistive film 420, separated by an insulating film (not show) from an adjacent high permeability magnetic film 430, which acts as a magnetic flux concentrator. The patterned magneto-resistive film 420 is shown to have two terminal ends 422 and 424, which are coupled to circuit traces (not shown), such as the circuit traces 322 and 324 of FIG. 3.

Due to the magneto-resistive effect, the resistance between the ends 422 and 424 of the patterned magneto-resistive film 420 depends of the flux density provided in the adjacent high permeability magnetic film 430. Thus, when a sensing element 320' is moved along the magnetic scale track 143, the resistance between the terminal ends 422 and 424 of the patterned magneto-resistive film 420 is modulated depending on the relation of the sensing element 320' to the field modulating elements of the scale track 143 (e.g., magnetized elements or track portions). The readhead signal processing circuit 160 may provide measurement signals based on that resistance, according to known techniques.

The high-permeability magnetic film 430 guides the magnetic field of the field modulating elements to the magneto-resistive film 420, to enhance the associated resistance modulation effect. The end portion of the high-permeability magnetic film 430 extends to the edge of the substrate 212', to couple as strongly as possible to the spatially modulated magnetic field of the scale track 143. A dimension $W_C$ of the end portion along the measuring axis direction may be chosen in cooperation with a parallel dimension of the field modulating elements of the scale track 143 to provide a desired signal modulation profile as the end portion is moved past the scale elements along the measuring axis. A dimension $W_R$ of the sensing element 320' may be wider than the dimension $W_C$, to provide a desired size and flux sensitivity for the sensing element 320'. In the embodiment shown in FIG. 4, when the field modulating elements of the scale track 143 are arranged according to a scale wavelength or pitch $P_T$, the intra-cell pitch of Pc' of the A and B sensing elements 320' may be Pc'=(N*$P_T$)+$P_T$/4, which provides A and B quadrature signals from the A and B sensing elements 320'. The utility of quadrature signals is known to one skilled in the art. Various other sensing pattern cell arrangements are possible using 3 or 4 sensing elements, or more, in order to provide additional measurement signals having additional spatial phase relationships, if desired.

The sensing element 320' may be further understood and/or modified by reference to similar elements disclosed in U.S. Pat. No. 5,889,403, which is hereby incorporated by reference in its entirety. Other sensing pattern cell arrangements and related signal processing may be understood with reference to U.S. Pat. Nos. 5,949,051; 5,386,642; 5,036,276; 6,229,301; and 7,173,414, each of which is hereby incorporated by reference in its entirety. Thus, it will be appreciated that FIG. 4 indicates one of many possible configurations for magneto-resistive sensors that may be used according to this invention, and is exemplary only, not limiting.

More generally, when the scale track 143 provides modulations of magnetic field strength or direction (e.g., by spatially modulated magnetization of a hard ferromagnetic material) the magnetic sensing elements 320 may utilize effects other than the magneto-resistive effect. For example, in one embodiment, the sensing elements 320 may include special inductor elements comprising a non-linear core material, where the inductance depends on the local magnetic field surrounding the inductor elements. Field modulations along the scale track 143, may be directed to the inductor elements via a magnetic circuit formed by the pattern of an adjacent highly permeable ferromagnetic film. The varying inductance of the sensing elements may be detected as the change in impedance across their terminal ends, according to known techniques. Various configurations that can be adapted for such sensing elements are disclosed in U.S. Pat. Nos. 7,180,146; 7,038,448; and 6,404,192, each of which is hereby incorporated by reference in its entirety.

In some embodiments, the scale track 143 may include modulations in the permeability of a magnetically soft ferromagnetic material. In some such embodiments, the magnetic sensing elements 320 may comprise of inductors whose impedance is altered depending on their proximity to the permeability modulations along the reference scale 143. In some such embodiments, the magnetic sensing elements 320 may comprise a small magnetic circuit that is perturbed by the permeability modulations along the scale track 143. For example, in one embodiment, the magnetic sensing elements 320 may include elements that are driven to generate a local magnetic field which is coupled to and modulated by the permeability modulations along the scale track 143. Such magnetic sensing elements 320 may further comprise special inductor elements similar to those outlined above, which are responsive to the modulations of the generated local magnetic field. In one configuration corresponding to such sensing elements, a sensing element comprises first and second miniature planar windings located adjacent to one another (e.g., along the edge of the substrate 212, within a sensor dimension $W_R$) such that they are electrically isolated and inductively coupled. The first winding is a generator winding that is driven to generate a changing magnetic field that extends to the second winding, which is a sensing winding. The resulting signal induced in the second winding depends on the changing magnetic flux density in the coupled magnetic field, which is modulated by the permeability modulations along the scale track 143. It will be appreciated that all of the foregoing sensing element configurations benefit from the small sensing gap that is provided according to this invention.

Figure 5:
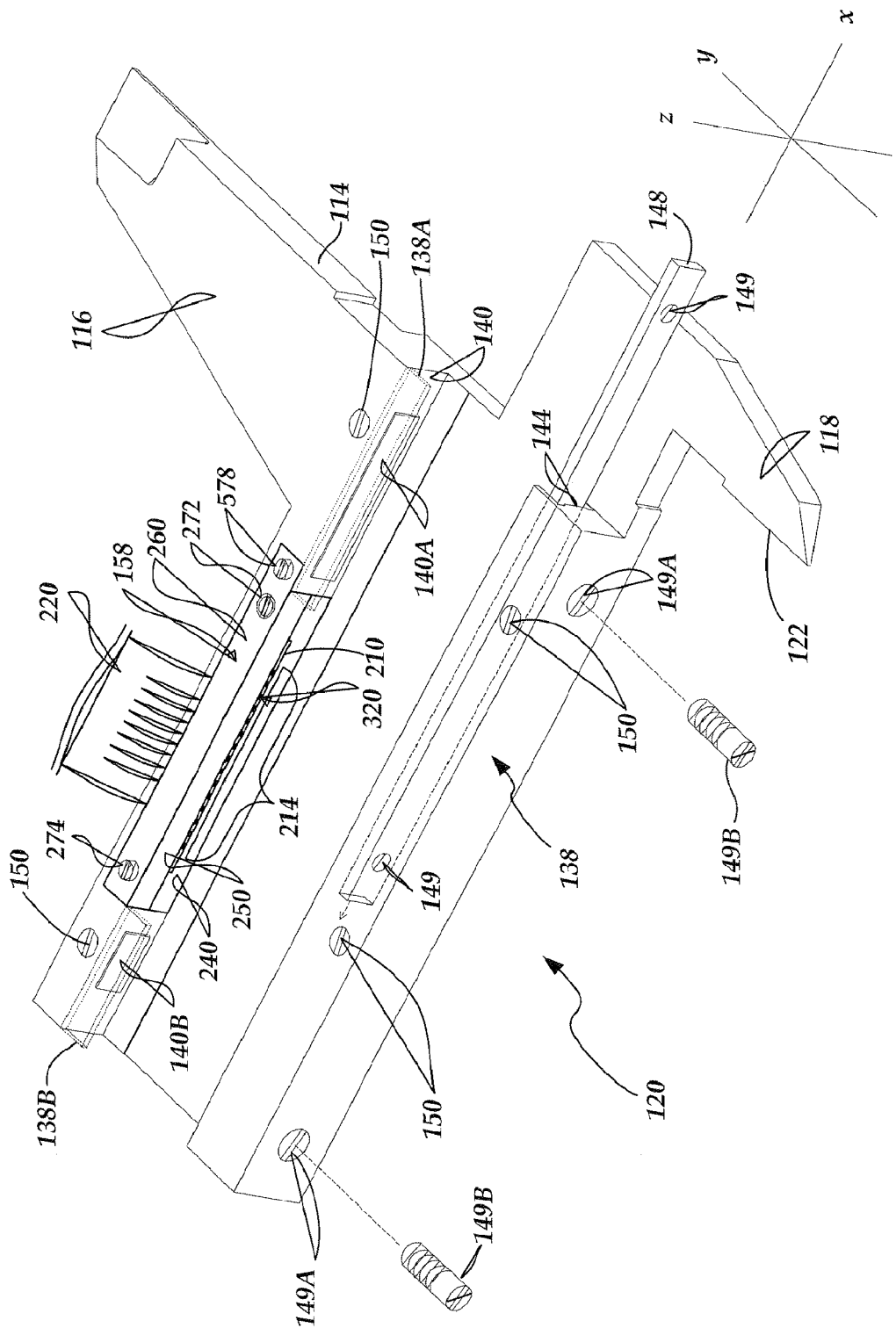
FIG. 5 is a diagram of a first exemplary embodiment of the slider assembly of FIG. 1 including the magnetic sensor assembly of FIGS. 2-4.

FIG. 5 is a diagram of the slider assembly 120 of FIG. 1, including the slider 138 and the magnetic sensor assembly 158 of FIGS. 2-4. FIG. 5 shows one exemplary reference edge interface configuration and one exemplary loading edge interface configuration in greater detail. As shown, in the reference edge interface configuration the magnetic sensor assembly 158 is mounted in a recess along the internal reference surface 140 of the slider 138, such that the sensing element array 214 is exposed toward the magnetic scale track 143. In various embodiments, the magnetic sensor assembly 158 is mounted such that the surfaces of the assembly blocks 240 and 250 slide along the reference edge surface 142 and the sensing element array 214 is aligned along the scale track 143. The sensing element array 214 may be assembled flush with, or at a small gap, relative to the adjacent sliding surfaces of the assembly blocks 240 and 250, to provide the desired operating gap for the sensing element array 214 relative to the scale track 143. As previously outlined with reference to FIG. 2, a wire spring 180 (hidden in FIG. 5) may push the magnetic sensor assembly 158 away from the slider 138 with a desired force, to insure that the sliding surfaces of the assembly blocks 240 and 250 slide against the reference edge 142 and/or the scale track 143. A mounting screw 578 attaches the compliant mounting member 260 to the slider 138. The mounting member 260 is stiff along the direction of the measuring axis and compliant along directions normal to the measuring axis direction. As shown in FIG. 5, the internal reference surface 140 may be configured to have a slight clearance surrounding two sliding surface portions 140A and 140B that straddle the magnetic sensor assembly 158 and slide against the reference edge 142 during operation. The portions 138A and 138B of the slider 138 are shown in wireframe, to more clearly illustrate the sliding surface portions 140A and 140B, which may be precision ground surface portions and/or portions coated with an anti-wear and/or anti-friction coating. Threaded holes 150 may receive screws that mount the electronic assembly 152 to the slider assembly 120.

Opposite the internal reference surface 140, in the loading edge interface configuration, the loading member 148 (e.g., a resilient pressure bar) is positioned between the internal loading surface 144 of the slider 138 and the loading edge 146 of the scale member 102. The loading member 148 includes two holes 149 that receive the tips of adjustment screws 149B that are threaded through the holes 149A. The adjustment screws 149B are adjusted such that a sliding surface portion of the loading member 148 is forced against the loading edge 146 with a desired force, which causes the internal reference surface 140 (e.g., the sliding surface portions 140A and 140B) to be forced against the reference edge 142 with approximately the same force.

As previously indicated, in some embodiments, a magnetic scale track 143 may be provided along the loading edge 146. In one such embodiment, the loading edge interface configuration may include a loading member that is "split" to provide separate sliding surface portions analogous to the sliding surface portions 140A and 140B. In another such embodiment, the loading member 148 may be omitted and the gap between the loading edge 146 and the internal loading surface 144 may be set to a practical minimum (e.g., approximately 50 microns). The tips of adjustment screws 149B that are threaded through the holes 149A may be flat and/or may include anti-ware and/or anti-friction materials and may be adjusted to slide against the loading edge 146, to provide separate sliding surface portions analogous to the sliding surface portions 140A and 140B. In either of these embodiments, the magnetic sensor assembly 158 may be mounted in a recess in the internal loading surface 144 of the slider 138, in a configuration that is approximately a "mirror image" of the configuration shown in FIG. 5, such that the sensing element array 214 is positioned at a small operating gap along the magnetic scale track 143 provided on the loading edge 146, straddled by sliding surface portions that govern and protect the operating gap according to design principles outlined above.

Figure 6:
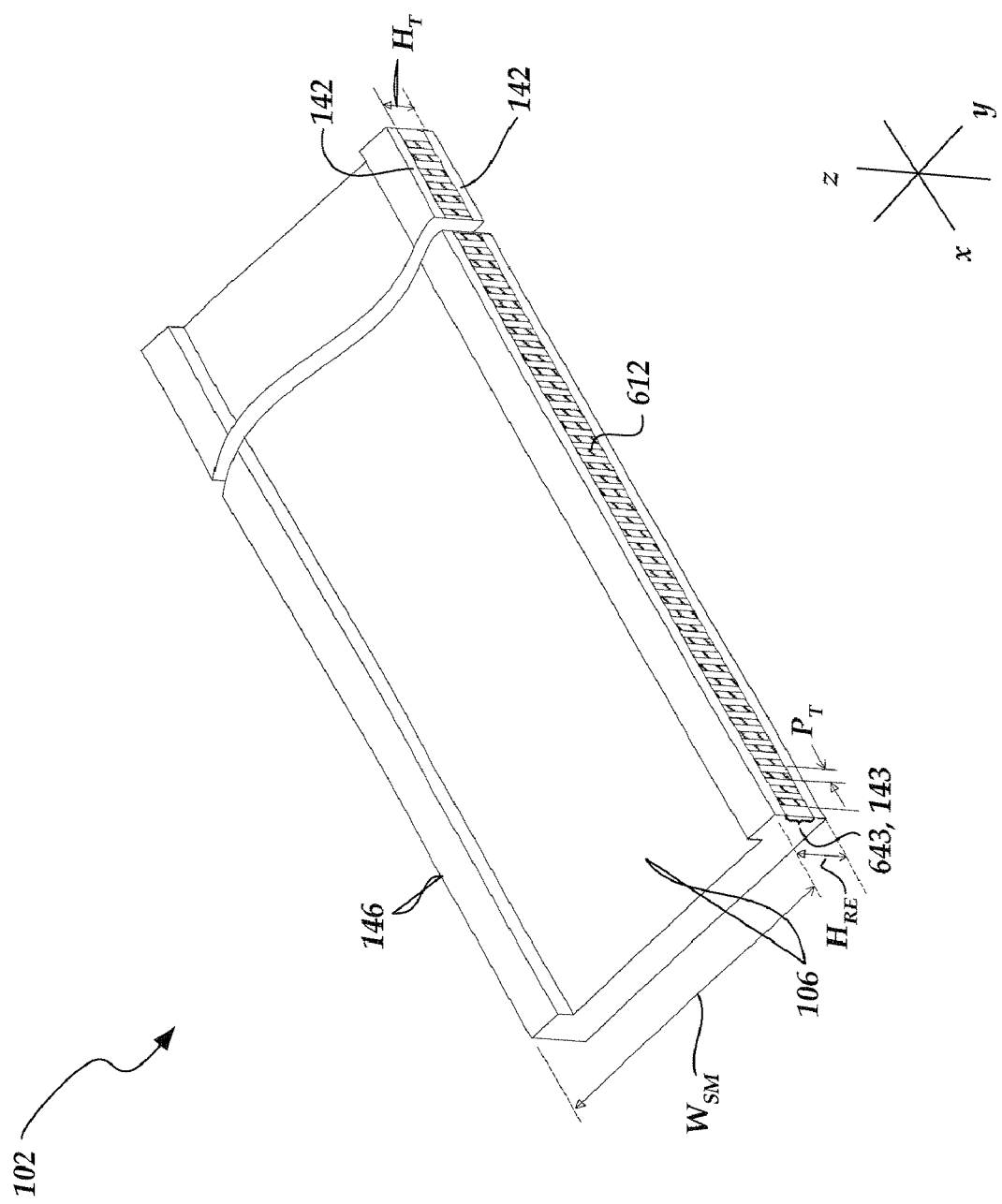
FIG. 6 is a diagram of a portion of the scale member of FIG. 1 including a scale track with scale elements arranged in a first exemplary pattern according to a scale pitch, for use with the magnetic sensor assembly of FIGS. 2-5.

FIG. 6 is a diagram of a portion of the scale member 102 of FIG. 1, including scale elements 612 arranged along the scale track 143 according to a first exemplary scale pattern 643. The scale pattern 643 is usable with the magnetic sensor assembly 158 of FIGS. 2-5. As shown in FIG. 6, the scale elements 612 are arranged according to a scale pitch $P_T$, and are coextensive with the scale track width $H_T$ orthogonal to the measuring axis direction, which may be less than the dimension $H_{RE}$ of the narrow reference edge 142. Each scale element 612 may have a dimension of approximately $P_T/2$ along the measuring axis direction.

In some embodiments, the scale track pattern 643 is formed as magnetized pattern in a hard ferromagnetic material formed along the reference edge 142. In such embodiments, the magneto-resistive sensing elements 320' or the alternative outlined above with reference to FIG. 4 may be used in the magnetic sensor assembly 158. In such embodiments, it is desirable that the material be hard magnetically with a large remanence. In one implementation, the material can be formed from a coating of a variety of potential materials (e.g., resin and ferrites, resin and metal powder, electroplated alloys, sputtered alloys similar to those used in the magnetic hard disk industry, sputtered materials such as used for magneto-optic data recording, etc.) Alternatively, the material may be inlaid or formed in a shallow scale track groove along the reference edge surface 142. Alternatively, in some embodiments, the reference member 102 may be formed of a suitable magnetizable material. In any case, the scale track material is chosen with careful consideration of tradeoffs between the design of the sensing elements 320, achievable signal strength and scale pitch $P_T$, and other considerations are similar to those related to magnetic data storage technology. In one embodiment, the magnetic scale track pattern 643 may be written into the scale track material using an appropriate inductive write head. In another embodiment, the scale track 143 may initially be uniformly magnetized in one direction and subsequently the magnetic scale track pattern 643 may be written by locally heating the scale track material (e.g., with a laser) to a temperature just above its Curie temperature, whereupon it is cooled in a field of opposite polarity to the initial uniform magnetization direction. More generally, any suitable known magnetic information writing technique may be used. In some embodiments, it is desirable that the scale track material and pattern writing technique are able to provide a scale track pitch $P_T$ on the order of at most 20 microns, or 10 microns, or less. In such embodiments, it may be possible to provide a desired measurement resolution that is suitable for hand tool type calipers with little or no signal interpolation. Of course, in other embodiments, coarser measurement resolution may be accepted, or some level of signal interpolation may be used, and the corresponding scale track pitch $P_T$ may be larger (e.g., on the order of approximately 100 microns).

In another embodiment, the scale track pattern 643 may be formed from magnetized, physically discrete, features along the scale track 143. An example would be laser drilled or cut holes in the form of the scale track pattern 643, which are filled with materials and magnetized approximately as outlined above with reference to a uniformly coated scale track. Alternatively, a uniformly coated scale track may be processed by known techniques to remove portions of the scale track material, leaving a desired pattern of physically discrete features that are magnetized or magnetizable.

In some embodiments, the scale elements 612 are not magnetized scale elements. In such embodiments, the scale elements do not directly provide a spatially modulated magnetic field that is sensed by the sensor elements of the magnetic sensor assembly 158. Rather, the sensor elements 320 of the of the magnetic sensor assembly 158 may be one of the "active" types outlined above as alternatives to the sensing elements 320', and the scale track pattern 643 may comprise scale elements that provide a material variation (e.g., physically discrete regions of a particular material) that affects their operation. For example, the scale elements may comprise discrete portions of a magnetically soft ferromagnetic material that modulates the magnetic permeability along the scale track 143. In some such embodiments, the magnetic sensing elements 320 may comprise miniature field generating elements including a small magnetic circuit that is perturbed by the permeability modulations along the scale track 143. For example, such magnetic sensing elements 320 may include elements that are driven to generate a local magnetic field which is coupled to and modulated by the permeability modulations along the scale track 143. Such magnetic sensing elements 320 may further comprise special inductor elements, which are responsive to the modulations of the generated local magnetic field. In such embodiments, although the scale elements do not directly provide a spatially modulated magnetic field, they modulate the magnetic field generated within an active magnetic sensing element 320, as it passes by. In general, known suitable materials and fabrications techniques may be used. For reasons outlined previously, in some embodiments, it is desirable that the scale track material and fabrication techniques are able to provide a scale track pitch $P_T$ on the order of at most 20 microns, or 10 microns, or less, whereas in other embodiments a larger scale track pitch $P_T$ may be used (e.g., on the order of approximately 100 microns).

It should be appreciated that although the scale track pattern 643 shows only the scale elements 612, more generally, in some embodiments the spaces between the scale elements 612 may be comprise a plurality of "opposite polarity" or "neutral" scale elements. For example, in one some embodiments, if the scale elements 612 each comprise a region magnetized with a first magnetization polarity, then each of the spaces between them may comprise regions that have an opposite magnetization polarity that may be introduced either inherently, or intentionally, during the pattern writing process. In other embodiments, if the scale elements 612 each comprise a strongly magnetized region, then each of the spaces between them may comprise regions that are nominally "unmagnetized." In such embodiments, certain types of sensor elements and/or their associated signal processing may be designed to provide enhanced measurement signals based on differences between the scale elements 612 relative to the regions between them. That is, the sensor elements may have a distinctive response to the regions between the scale elements 612, as well as to the scale elements 612 themselves.

In any case, the caliper configuration corresponding to the FIGS. 5 and 6 can provide signals that may be combined to provide a robust high-resolution displacement signal (e.g., quadrature signals with a measuring resolution of at least $P_T/4$).

With regard to specific example dimensions for the scale track pattern 643 and sensing element head 210, in one specific embodiment the reference edge may have a dimension $H_{RE}$ that is at most 4000 microns (e.g., $H_{RE}$=3500 microns), the scale track 143 may have a width dimension $H_T$=1500 microns, and a scale pitch $P_T$=20 microns, or 10 microns. In one specific embodiment, the sensing element head 210 may have 16 sensing pattern cells arranged with a sensing pattern pitch Pp=80 microns. Each sensing element may have a dimension $W_C$=$P_T/2$, and a dimension $W_R$=$P_T$. In one embodiment, at least some of the sensing pattern cells may include at least two sensing elements arranged in quadrature, with an intra-cell pitch Pc=$(P_T+P_T/4)$. The connector pad array 216 may have a center-to-center spacing of approximately 200 microns. The overall width of the substrate 212 along the x axis direction may be approximately 13 millimeters. It should be appreciated that this specific embodiment is exemplary only, and is not limiting.

FIGS. 7-12 illustrate alternative embodiments for the magnetic sensor assembly 158, the slider assembly 120, and the scale track pattern 643 on the reference edge surface 142. As will be described in more detail below, in the embodiments of FIGS. 7-12, the scale elements of the scale track form are arranged in multiple sub-tracks, and the sensing element head (e.g., the sensing element head 210) is oriented at an angle relative to the measuring axis direction.

Figure 7:
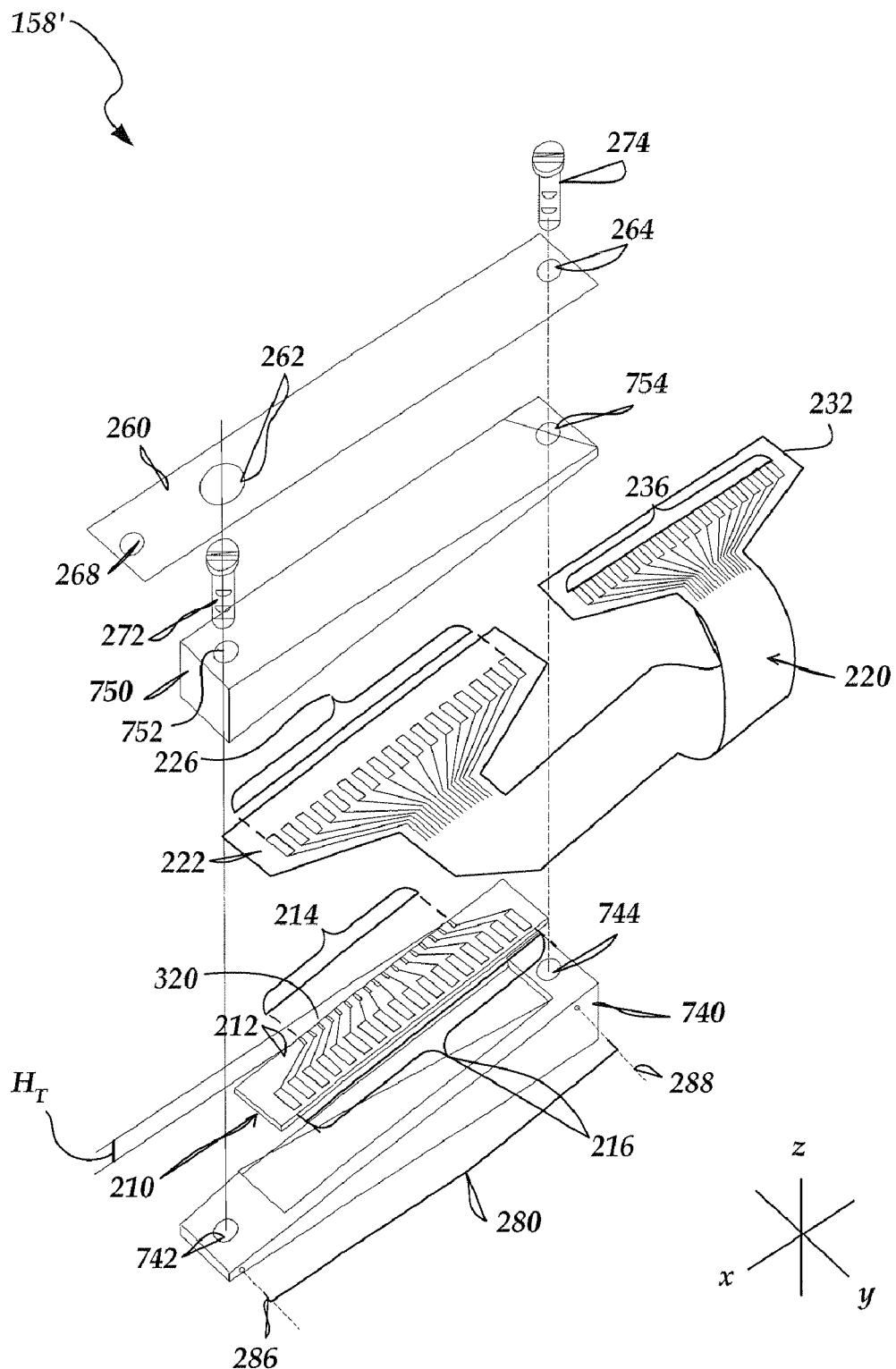
FIG. 7 is a diagram of a second exemplary embodiment of a magnetic sensor assembly usable in the caliper of FIG. 1.
Figure 8:
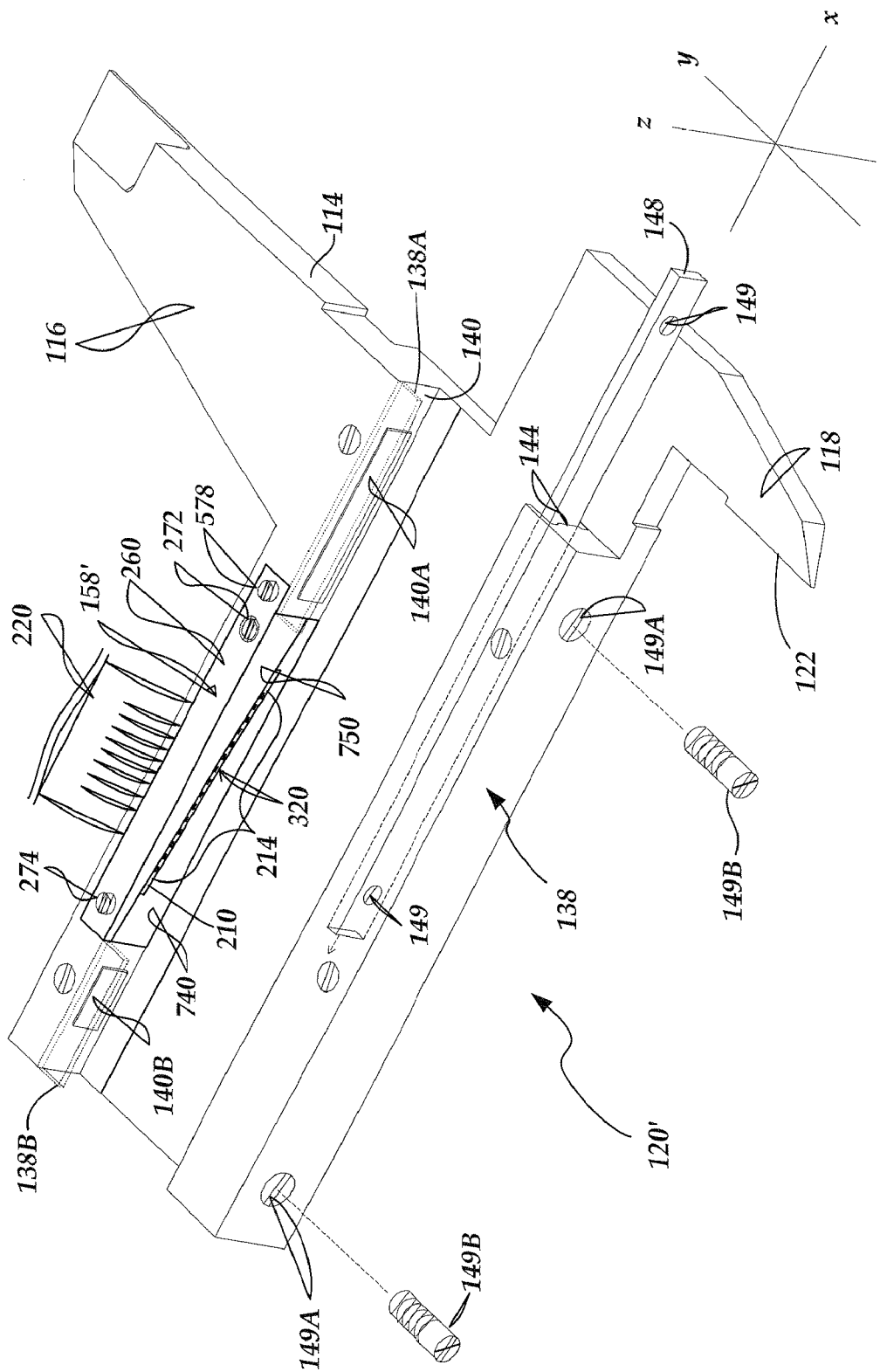
FIG. 8 is a diagram of a second exemplary embodiment of the slider assembly of FIG. 1 including the magnetic sensor assembly of FIG. 7.

FIGS. 7 and 8 are diagrams including a second exemplary embodiment of a magnetic sensor assembly 158' usable in place of the magnetic sensor assembly 158 shown in FIGS. 1, 2 and 5. Briefly stated, the magnetic sensor assembly 158' shown in FIG. 7 is similar in construction, assembly, and operation to the magnetic sensor assembly 158 of FIG. 2, except as otherwise described below. Similarly numbered elements may be similar or identical between the magnetic sensor assemblies 158' and 158. As shown in FIG. 7, the magnetic sensor assembly 158' includes a bottom assembly block 740 and a top assembly block 750. In contrast to the assembly blocks 240 and 250 of FIG. 2, the assembly blocks 740 and 750 of FIG. 7 position the sensing element head 210 such that it is tilted in the magnetic sensor assembly 158', to distribute the sensing elements 320 over a dimension approximately equal to the width dimension $H_T$ of the scale track 143, for reasons described further below.

FIG. 8 is a diagram second exemplary embodiment of a slider assembly 120' including the magnetic sensor assembly 158' of FIG. 7. The slider assembly 120' is usable in place of the slider assembly 120 shown in FIGS. 1 and 5. Briefly stated, the slider assembly 120' shown in FIG. 7 is similar in construction, assembly, and operation to the slider assembly 120 of FIG. 2, except as otherwise described below. Similarly numbered elements may be similar or identical between the slider assemblies 120' and 120. As shown in FIG. 7, the sensing element array 214 is tilted such that its individual sensing elements 320 are distributed across the scale track 143 along the direction of the z axis, as well as along the x axis. Thus, the sensing elements 320 are individually aligned with respective scale elements that are arranged to form codes in a plurality of respective sub-tracks along the scale track 143, as described in more detail below with reference to FIG. 9.

Figure 9:
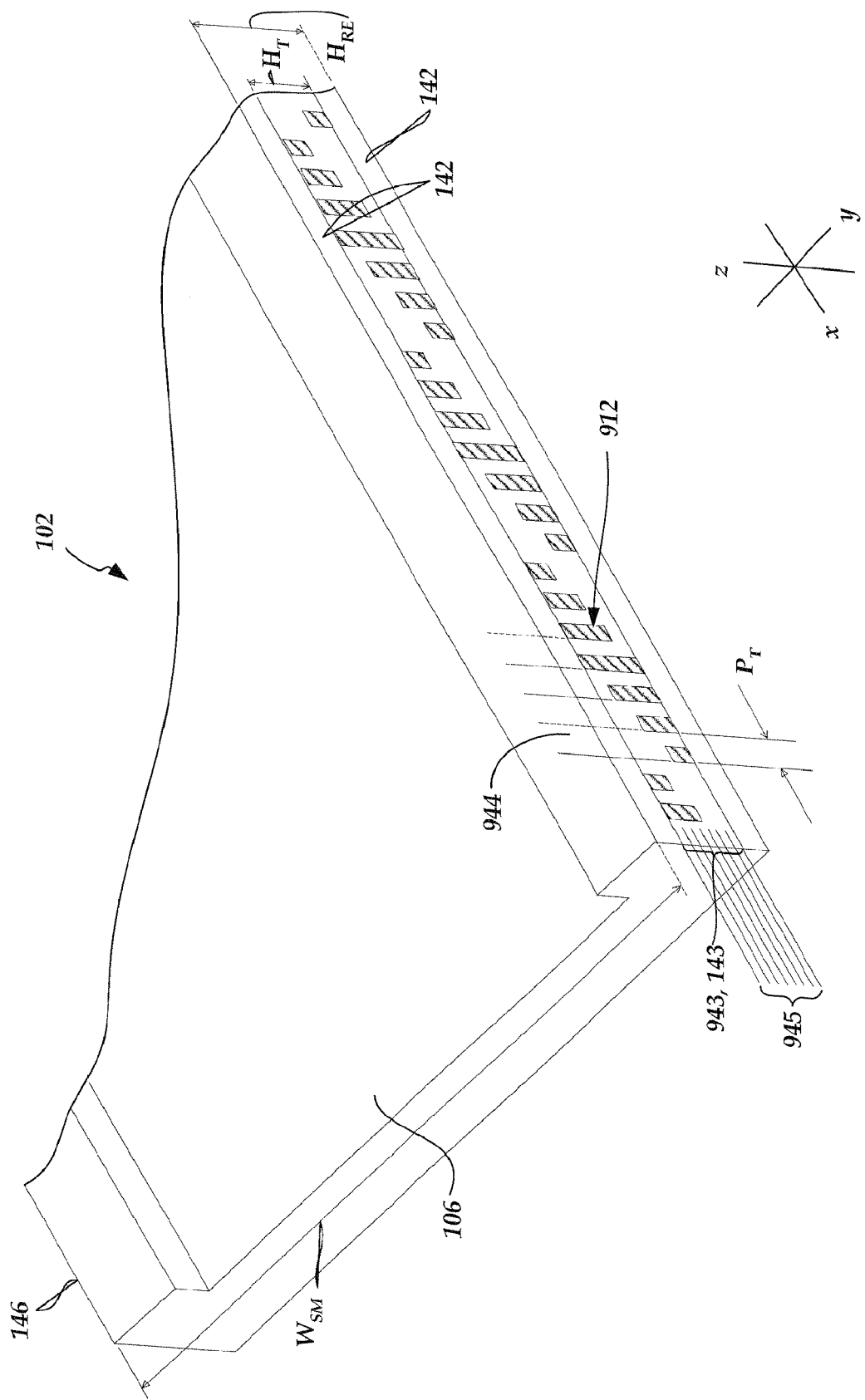
FIG. 9 is a diagram of a portion of the scale member of FIG. 1 including a scale track with scale elements arranged in a second exemplary pattern according to a scale pitch, for use with the magnetic sensor assembly of FIGS. 7 and 8.

FIG. 9 is a diagram of a portion of the scale member 102 of FIG. 1, including scale elements 912 that are arranged along the scale track 143 according to a second exemplary scale pattern 943. The scale pattern 943 is usable with the magnetic sensor assembly 158' of FIGS. 7 and 8. Briefly stated, the scale elements 912 in the scale pattern 943 (and the associated sensing elements 320) may be similar in fabrication and operation to scale elements 612 in the scale pattern 643 of FIG. 6, except as otherwise described below. The scale pattern 943 includes a plurality of parallel subtracks 945 within the scale track 143, with each of the subtracks 945 including scale element zones 944 arranged along the scale pattern 943 according to a scale pitch $P_T$. The intersection of each sub-track 945 with each scale element zone defines a code zone. The scale elements 912 are configured to locate their portions in some code zones, but not in others, such that the magnetic sensor assembly 158' outputs coded sets of signals, as it is moved or positioned along the measuring axis relative to the scale pattern 943. Thus, an embodiment of the caliper 100 corresponding to the FIGS. 7-9 can provide signals that may be combined to provide a robust high-resolution displacement signal (e.g., quadrature signals with a measuring resolution of at least $P_T/4$), as well to a provide a unique absolute position code associated with each measurement signal period (each spatial period) of the high-resolution displacement signal. It should be appreciated that the particular arrangement of the scale elements 912 in the scale pattern 943 is just a schematic illustration representative of many alternative arrangements, and is not limiting.

It should be noted that in discussion related to FIGS. 3 and 4, it was suggested that a sensing pattern pitch Pp of the sensing element head 210 may be selected such that Pp=N*$P_T$. However, when the sensing element head 210 is tilted at an tilt angle TA relative to the measuring axis as described for the configuration of FIGS. 7-9, then the relationship between the sensing pattern pitch Pp and scale pitch $P_T$ is more appropriately Pp*cos(TA)=N*$P_T$. Similarly, the relationship between the intra-cell pitch of Pc' of the A and B sensing elements 320' shown in FIG. 4 is more appropriately Pc'*cos(TA)=(N*$P_T$)+$P_T$/4, in order to provide A and B quadrature signals from the A and B sensing elements 320'.

With regard to specific example dimensions for the scale track pattern 943 and sensing element head 210, in one specific embodiment using 16 sensor elements 320 and 16 subtracks 945, the reference edge may have a dimension $H_{RE}$ that is at most 4000 microns (e.g., $H_{RE}$=3500 microns), the scale track 143 may have a width dimension $H_T$=2400 microns, with subtrack widths of 150 microns, and a scale pitch $P_T$=20 microns, or 10 microns. In one specific embodiment, the sensing element head 210 may be tilted at an angle of approximately TA=30 degrees from x axis, and may have 16 sensing pattern cells arranged with a sensing pattern pitch Pp=300 microns. Each sensing element may have a dimension $W_C$=$P_T/2$, and a dimension $W_R$=$P_T$. In one embodiment, at least some of the sensing pattern cells may include at least two sensing elements arranged in quadrature, with an intra-cell pitch Pc=($P_T$+$P_T/4$). The connector pad array 216 may have a center-to-center spacing of approximately 200 microns. The overall width of the substrate 212 along the x axis direction may be approximately 13 millimeters. It should be appreciated that this specific embodiment is exemplary only, and is not limiting.

Figure 10:
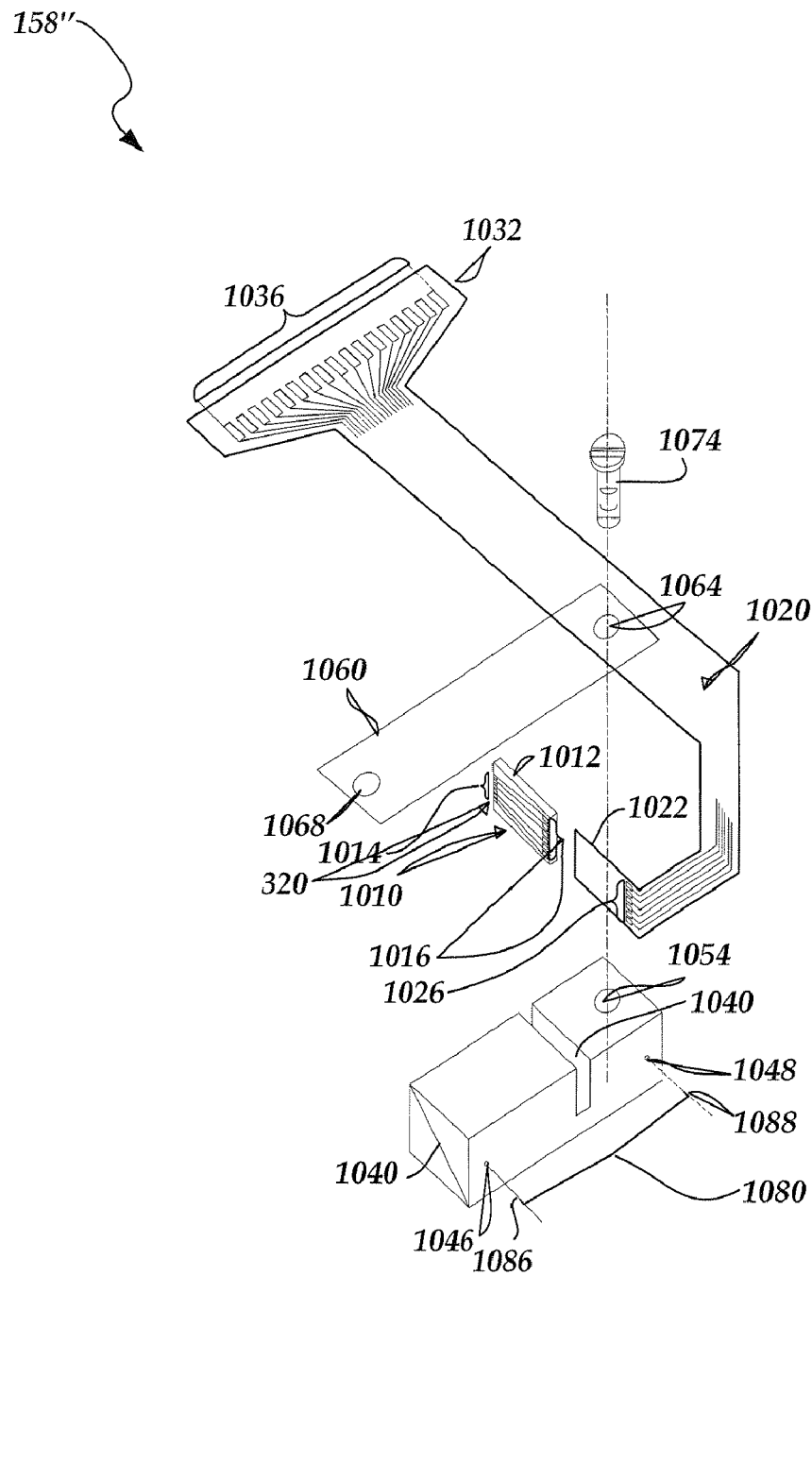
FIG. 10 is a diagram of a third exemplary embodiment of a magnetic sensor assembly usable in the caliper of FIG. 1.

FIG. 10 is a diagram of a third exemplary embodiment of a magnetic sensor assembly 158" usable in place of the magnetic sensor assembly 158 shown in FIGS. 1, 2 and 5. In the magnetic sensor assembly 158" a sensing element head 1010 is oriented orthogonal to the measuring axis direction. This configuration allows the magnetic sensor assembly 158" to read information from a scale track 143 that includes multiple parallel sub-tracks, as described below with reference to FIG. 12. The magnetic sensor assembly 158" includes the sensing element head 1010, a flexible connector 1020, an assembly block 1040, a mounting member 1060 and a wire spring 1080. The sensing element head 1010 includes a plurality of the previously described sensing elements 320, which form a sensing element array 1014 that is connected to a connector pad array 1016 by a series of wires, all disposed on a substrate 1012. In the sensing element array 1014, the sensing elements 320 are generally evenly spaced such that each one will coincide with one of the subtracks 1245 shown in FIG. 12. The arrays 1014 and 1016 are shown schematically in FIG. 10, for clarity. In various embodiments the arrays 1014 and 1016 may include more elements than illustrated in FIG. 10.

The flexible connector 1020 has a first end 1022 which includes a connector pad array 1026, which is connected to the connector pad array 1016 on the readhead sensing element head 1010. The flexible connector 1020 also has a second end 1032, which includes a connector pad array 1036, which is connected to a connector pad array on the signal processing and display circuit board 154 of FIG. 1.

Figure 11:
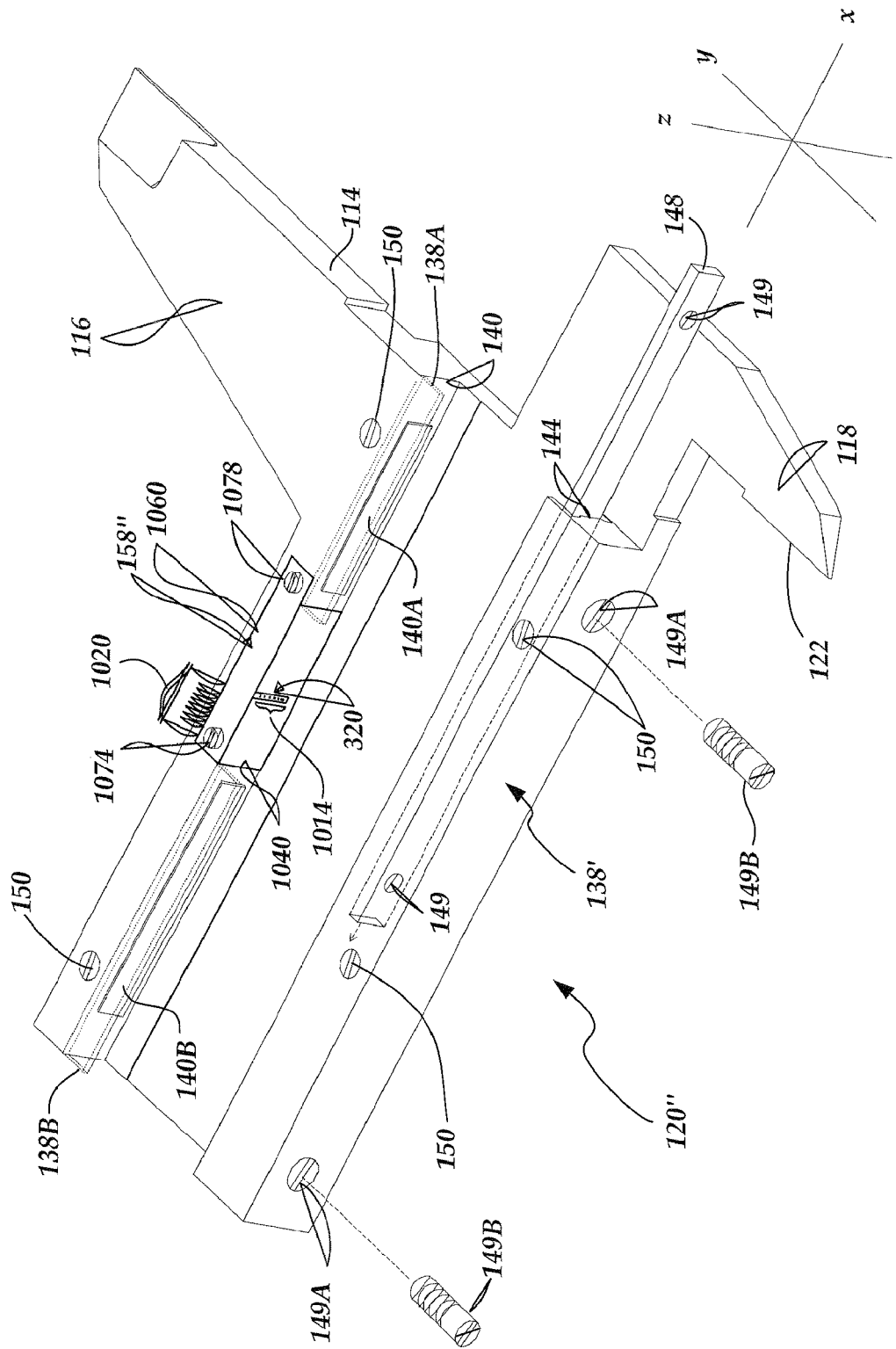
FIG. 11 a diagram of a third exemplary embodiment of the slider assembly of FIG. 1 including the magnetic sensor assembly of FIG. 10.

The magnetic sensor assembly 158" may be assembled by bonding the sensing element head 1010 into the slot 1041 in the assembly block 1040, with the sensing element array 1014 located proximate to the surface of the assembly block 1040 that will slide on the reference edge 142. The mounting member 1060 is attached to the top of the assembly block 1040, which includes a mounting hole 1064 that receives the assembly screw 1074. As shown in FIG. 11, the mounting member 1060 is used to fix the magnetic sensor assembly 158" relative to the slider 138' of the slider assembly 120". The wire spring 1080 includes ends 1086 and 1088 which are received by holes 1046 and 1048 in the assembly block 1040. The wire spring 1080 is shaped with a slight bend so as to push the magnetic sensor assembly 158" away from the slider 138' and against the reference edge 142 and/or the scale track 143 with a desired force, to insure that the sensing element array 1014 is located with the desired gap (e.g., a small gap, or no gap) relative to the scale track 143.

FIG. 11 is a diagram of a third exemplary embodiment of a slider assembly 120" including the magnetic sensor assembly 158" of FIG. 10. The slider assembly 120" is usable in place of the slider assembly 120 shown in FIGS. 1 and 5. Briefly stated, the slider assembly 120" shown in FIG. 7 is similar in construction, assembly, and operation to the slider assembly 120 of FIG. 2, except as otherwise described below. Similarly numbered elements may be similar or identical between the slider assemblies 120" and 120. As shown in FIG. 11, the sensing element array 1014 is orthogonal to the measuring axis direction such that its individual sensing elements 320 are distributed across the scale track 143 along the direction of the z axis. Thus, the sensing elements 320 are individually aligned with respective scale elements that are arranged to form codes in a plurality of respective sub-tracks along the scale track 143, as described in more detail below with reference to FIG. 12.

Figure 12:
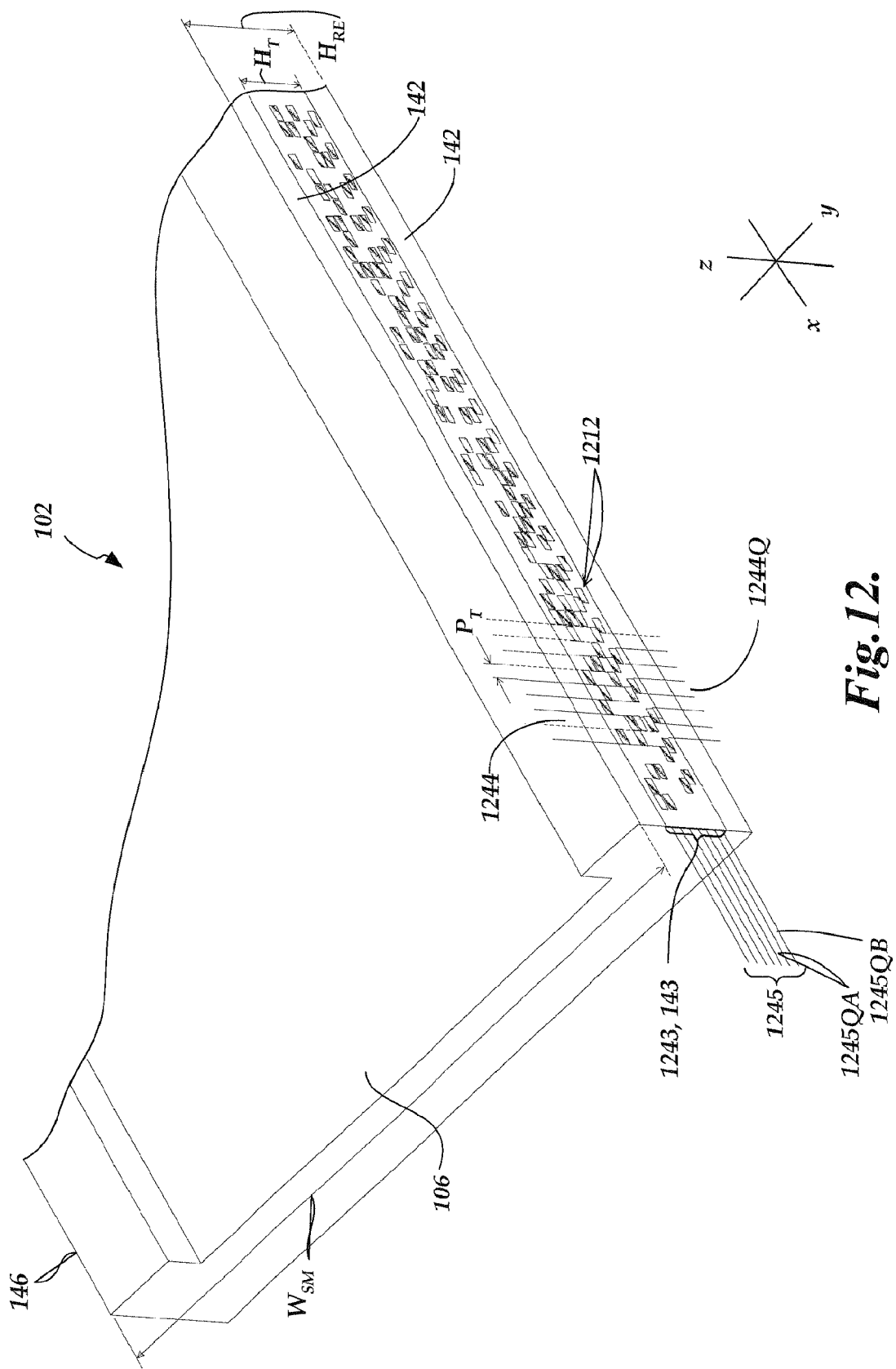
FIG. 12 is a diagram of a portion of the scale member of FIG. 1 including a scale track with scale elements arranged in a third exemplary pattern having a scale pitch, for use with the magnetic sensor assembly of FIGS. 10 and 11.

FIG. 12 is a diagram of a portion of the scale member 102 of FIG. 1, including scale elements 1212 that are arranged along the scale track 143 according to a third exemplary scale pattern 1243. The scale pattern 1243 is usable with the magnetic sensor assembly 158" of FIGS. 10 and 11. Briefly stated, the scale elements 1212 in the scale pattern 1243 (and the associated sensing elements 320) may be similar in fabrication and operation to scale elements 612 in the scale pattern 643 of FIG. 6, except as otherwise described below. The scale pattern 1243 includes a plurality of parallel subtracks 1245 within the scale track 143, with each of the subtracks 1245 including scale element zones 1244 arranged along the scale pattern 1243 according to a scale pitch $P_T$. The intersection of each subtrack 1245 with each scale element zone defines a code zone. The scale elements 1212 located in some code zones, but not in others, such that the magnetic sensor assembly 158" outputs coded sets of signals, as it is moved or positioned along the measuring axis relative to the scale pattern 1243. Thus, an embodiment of the caliper 100 corresponding to the FIGS. 10-12 can provide signals that may be combined to a provide a unique absolute position code associated with each spatial period, or each scale element zone, at the scale pitch $P_T$. In the embodiment shown in FIG. 12, subtracks 1245QA and 1245QB are configured to provide quadrature signals with a period of $2*P_T$, with the scale element zones 1244Q of the subtrack 1245QB offset by $P_T/4$ along the measuring axis, relative to the scale element zones 1244. The quadrature signals of the subtracks 1245QA and 1245QB may provide a measurement resolution of $P_T/2$. It should be appreciated that the particular arrangement of the scale elements 1212 in the scale pattern 1243 is just a schematic illustration representative of many alternative arrangements, and is not limiting.

With regard to specific example dimensions for the scale track pattern 1243 and sensing element head 1010, in one specific embodiment using 16 sensor elements 320 and 16 subtracks 1245, the reference edge may have a dimension $H_{RE}=3500$ microns, the scale track 143 may have a width dimension $H_T=2400$ microns, with subtrack widths of 150 microns, and a scale pitch $P_T=10$ microns, or 5 microns. The sensing element head 1010 may have a center-to-center spacing of 150 microns between 16 sensor elements 320 in the sensing element array 1014, and the connector pad array 1016 may comprise 2 rows of pads with a center-to-center spacing of approximately 200 microns between the pads in each row. The overall width of the substrate 1012 along the z axis direction may be approximately 3.4 millimeters. It should be appreciated that this specific embodiment is exemplary only, and is not limiting.

As outlined previously, certain compact "jawless" calipers are used as low cost linear scales. Such compact jawless calipers generally comprise similar or identical components to related compact hand tool type calipers the include jaws. Such jawless calipers are characterized by similar sliding surfaces at the reference and loading edges, similar reference and loading edge dimensions, and similar measurement resolutions. Thus, although the various embodiments illustrated herein include jaws, it will be understood that such embodiments are representative of addition embodiments in which the jaws (e.g., the jaws 116, 114, 118 and 110) may be omitted.

While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. A compact electronic caliper comprising an elongated scale member that extends along a measuring axis direction, a slider assembly that slides along the scale member, and a signal processing circuit that is fixed relative to the slider assembly, the scale member comprising:
   a reference edge surface that extends along the measuring axis direction and that has a first narrow dimension orthogonal to the measuring axis direction;
   a loading edge surface that extends along the measuring axis direction and that has a second narrow dimension orthogonal to the measuring axis direction;
   a top surface located between the reference edge surface and the loading edge surface, the top surface having a wide dimension orthogonal to the measuring axis direction that is wider than the first and second narrow dimensions; and
   a scale track that extends along the measuring axis direction, the scale track comprising magnetic field modulating elements arranged in a scale track pattern corresponding to a scale pitch PT along the measuring axis direction, and the slider assembly comprising:
   a slider;
   a reference edge interface configuration comprising an internal reference surface of the slider, the internal reference surface comprising at least one sliding surface portion that slides along the reference edge surface during operation;
   a loading edge interface configuration comprising an internal loading surface of the slider that opposes the loading edge surface, and at least one sliding surface portion that slides along the loading edge surface during operation; and
   a sensor assembly comprising a plurality of respective sensing elements that are positioned along the scale track and that are responsive to the magnetic field modulating elements and that are connected to provide a plurality of respective output signals to the signal processing circuit, the plurality of respective output signals indicative of the displacement of the slider assembly relative to the scale member along the measuring axis direction, and the compact electronic caliper comprises at least one of the configurations A and B, wherein:
   in the configuration A the scale track is arranged along the reference edge surface within the first narrow dimension, the internal reference surface comprises first and second sliding surface portions that slide against the reference edge surface during operation and that are spaced apart from one another along the measuring axis direction, and the sensor assembly is included in the reference edge interface configuration with the plurality of respective sensing elements positioned along the scale track between the first and second sliding surface portions; and
   in the configuration B the scale track is arranged along the loading edge surface within the second narrow dimension, the at least one sliding surface portion that slides along the loading edge surface comprises first and second sliding surface portions that are spaced apart from one another along the measuring axis direction, and the sensor assembly is included in the loading edge interface configuration with the plurality of respective sensing elements positioned along the scale track between the first and second sliding surface portions.

2. The caliper of claim 1, wherein the caliper comprises the configuration A, and not the configuration B.

3. The caliper of claim 2, wherein:
the loading edge interface configuration further comprises at least one adjustment screw and a loading member that is positioned between the internal loading surface of the slider and the loading edge surface;
the loading member provides the at least one sliding surface portion that slides along the loading edge surface during operation; and
the at least one adjustment screw is threaded into the slider and positioned and adjusted to load the loading member against the loading edge surface.

4. The caliper of claim 1, wherein the caliper comprises the configuration B, and not the configuration A.

5. The caliper of claim 4, wherein:
the loading edge interface configuration further comprises first and second adjustment screws; and
in the loading edge interface configuration, the first and second adjustment screws are threaded into the slider and positioned and adjusted to load the first and second sliding surface portions against the loading edge surface.

6. The caliper of claim 5 wherein, in the loading edge interface configuration, tips of the first and second adjustment screws provide the first and second sliding surface portions that slide against the loading edge surface.

7. The caliper of claim 1, wherein the scale pitch PT is at most 100 microns.

8. The caliper of claim 7, wherein the scale pitch PT is at most 20 microns.

9. The caliper of claim 7, wherein the magnetic field modulating elements have a dimension along the measuring axis that is at most PT.

10. The caliper of claim 9, wherein the magnetic field modulating elements have a dimension along the measuring axis that is at most PT/2.

11. The caliper of claim 1, wherein the sensor assembly comprises a planar substrate, and the plurality of respective sensing elements are located proximate to an edge of the planar substrate and spaced apart from one another along a direction of the edge.

12. The caliper of claim 11, wherein the edge of the planar substrate is arranged nominally parallel to the measuring axis direction.

13. The caliper of claim 11, wherein the scale track pattern comprises a plurality of respective subtracks that extend parallel to one another along the measuring axis direction, and the sensor assembly is arranged such that at least one of the respective sensing elements is aligned with each of the respective subtracks and is responsive to the magnetic field modulating elements arranged along that respective subtrack.

14. The caliper of claim 13, wherein edge of the planar substrate is arranged at a tilt angle relative to the measuring axis direction.

15. The caliper of claim 14, wherein edge of the planar substrate is arranged orthogonally to the measuring axis direction.

16. The caliper of claim 1, wherein the sensor assembly is arranged such that the respective sensing elements have an operating gap of at most 50 microns relative to a surface of the scale track.

17. The caliper of claim 16, wherein the sensor assembly is arranged such that the respective sensing elements have an operating gap of at most 25 microns relative to the surface of the scale track.

18. The caliper of claim 16, wherein the sensor assembly is arranged to slide on at least one of an adjacent reference edge surface, an adjacent loading edge surface, and an adjacent surface of the scale track.

19. The caliper of claim 1, wherein the magnetic field modulating elements comprise magnetized elements that generate local magnetic fields along the scale track, and the respective sensing elements are configured to respond to the local magnetic fields along the scale track.

20. The caliper of claim 19, wherein the respective sensing elements comprise magnetoresistive material.

21. The caliper of claim 19, wherein each respective sensing element comprises a miniature flux generating winding that is inductively coupled to a miniature sensing winding.

22. The caliper of claim 1, wherein;
the magnetic field modulating elements comprise magnetically permeable elements that provide a varying magnetic permeability along the scale track, and the respective sensing elements are configured to generate and respond to a changing local magnetic flux, and the changing local magnetic flux responds to the varying magnetic permeability along the scale track.

23. The caliper of claim 1, wherein the first and second narrow dimensions are each at most 4000 microns.

* * * * *

UNITED STATES PATENT AND TRADEMARK OFFICE
CERTIFICATE OF CORRECTION

PATENT NO. : 7,530,177 B1 Page 1 of 1
APPLICATION NO. : 11/937427
DATED : May 12, 2009
INVENTOR(S) : M. E. Meichle et al.

It is certified that error appears in the above-identified patent and that said Letters Patent is hereby corrected as shown below:

COLUMN     LINE

18     11     after "wherein" insert --the--
(Claim 14,   line 1)

18     14     after "wherein" insert --the--
(Claim 15,   line 1)

Signed and Sealed this

Ninth Day of March, 2010

David J. Kappos
*Director of the United States Patent and Trademark Office*